United States Patent [19]
Moro et al.

[11] Patent Number: 5,614,991
[45] Date of Patent: Mar. 25, 1997

[54] DOCUMENT PLACEMENT MECHANISM AND IMAGE READING DEVICE FOR BOOKS

[75] Inventors: Fuminori Moro; Hiroshi Nagashima, both of Tokyo, Japan

[73] Assignee: Minolta Co., Ltd., Osaka, Japan

[21] Appl. No.: 400,676

[22] Filed: Mar. 8, 1995

[30]     Foreign Application Priority Data

Mar. 14, 1994  [JP]  Japan .................................. 6-042685

[51]  Int. Cl.$^6$ ............................ G03B 27/62; G09F 19/00
[52]  U.S. Cl. ................................................. 355/75; 40/530
[58]  Field of Search ........................ 355/25, 75; 40/531, 40/530

[56]          References Cited

U.S. PATENT DOCUMENTS

| | | | |
|---|---|---|---|
| 4,080,070 | 3/1978 | Spence-Bate | 355/75 |
| 5,471,277 | 11/1995 | Fujioka et al. | 355/25 |

FOREIGN PATENT DOCUMENTS

| | | |
|---|---|---|
| 6331264 | 2/1988 | Japan . |
| 320828 | 5/1991 | Japan . |

Primary Examiner—Arthur T. Grimley
Assistant Examiner—Herbert V. Kerner
Attorney, Agent, or Firm—Price, Gess & Ubell

[57]           ABSTRACT

The present invention relates to a document placement device suitable for accommodating book-like documents for image reading and image reader device provided with the document placement device. The document placement device has a first platform for placement of pages on the right side of an open book document on the top surface thereof and a second platform provided adjacent to said first platform for placement of pages on the left side of an open book document on the top surface thereof. The first platform slides in a rightward direction when raised thereby inducing the second platform to slide in a rightward direction while being moved in a downward direction, and the first platform slides in a leftward direction when lowered thereby inducing the second platform to slide in a leftward direction while being moved in an upward direction.

14 Claims, 8 Drawing Sheets

DOCUMENT PLACEMENT MECHANISM AND IMAGE READING DEVICE FOR BOOKS

BACKGROUND OF THE INVENTION

1. Field of the Invention

The present invention relates to a document placement device provided in an image reader device such as a copying apparatus, facsimile and the like, and more specifically relates to a document placement device suitable for accommodating book-like documents for image reading and image reader device provided with said document placement device.

2. Description of the Related Art

There are various conventional document placement mechanisms used in image reader devices for copying apparatus, facsimiles and the like. One such document placement mechanism maintains a document with the surface to be read pressed against the bottom of a glass plate used as a glass platen.

In such a document reading mechanism, the surface of the document to be read is optically exposed and read from above, such that the operation can be performed while the document surface to be read is visible from above through the glass platen. Accordingly, the document can be easily positioned, thereby reducing the reading errors.

However, the aforesaid document placement mechanism provides that the document surface to be read is placed in direct contact with the glass platen such that the reading surface is flat. Therefore, when a document is set on the document placement mechanism, the document surface to be read and the surface of the glass platen must be pressed into a state of mutual contact. Specifically, the document must be pressed against a stationary glass platen from the underside, or the glass platen must be pressed against the placed document from above. Therefore, a serious disadvantage occurs in the case of reading many pages of a bound document such as a book, inasmuch as the glass platen and document must be separated each time the reading of each open page is completed to turn the pages.

Furthermore, in the case of documents in book form, the first pages and last pages shift with the thickness of the book, i.e., the gutter (binding portion) of the book at the center area between the right and left open pages shifts as the thickness of the turned pages accumulating on right and left sides changes, such that a bulging deformation is produced in the pages to be read.

An object of the present invention is to eliminate the previously described disadvantages by providing a document placement device which holds the surface to be read of a open book-like document in a flat state, and corrects shifting of the center position (binding portion) of said open document, and a document reader device provided with said document placement device.

SUMMARY OF THE INVENTION

The previously described objects of the present invention are achieved by providing a document placement mechanism comprising a first platform for placement of pages on the left side of an open book document on the top surface thereof, a second platform provided adjacent to said first platform for placement of pages on the right side of an open book document on the top surface thereof, a support mechanism for supporting said first and second platforms so as to be movable in vertical and bilateral directions while holding the top surfaces of said first and second platform in a horizontal orientation, said support mechanism including a linkage means for linking the movement of said first and second platforms such that said first platform slides in a rightward direction when raised thereby inducing said second platform to slide in a rightward direction while being moved in a downward direction, and said first platform slides in a leftward direction when lowered thereby inducing said second platform to slide in a leftward direction while being moved in an upward direction.

The present invention further provides a document placement mechanism comprising, a first platform for placement of pages on one side of an open book document on the top surface thereof, a second platform provided adjacent to said first platform for placement of pages on the other side of an open book document on the top surface thereof, a support mechanism for supporting said first and second platforms so as to be movable in vertical and horizontal directions while holding the top surfaces of said first and second platform in a horizontal orientation, said support mechanism including a V-type linkage arm member which is rotatably supported at the center portion thereof and is rotatably connected to said first and second platforms at both end portions thereof so as to link the first and second platforms to each other, whereby said first platform slides to the interior side when raised thereby inducing said second platform to slide to the exterior side while being moved in a downward direction, and said first platform slides to the exterior side when lowered thereby inducing said second platform to slide to the interior side while being moved in an upward direction.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the image reader device of the present invention are described hereinafter with reference to the accompanying drawings.

Figure 1:
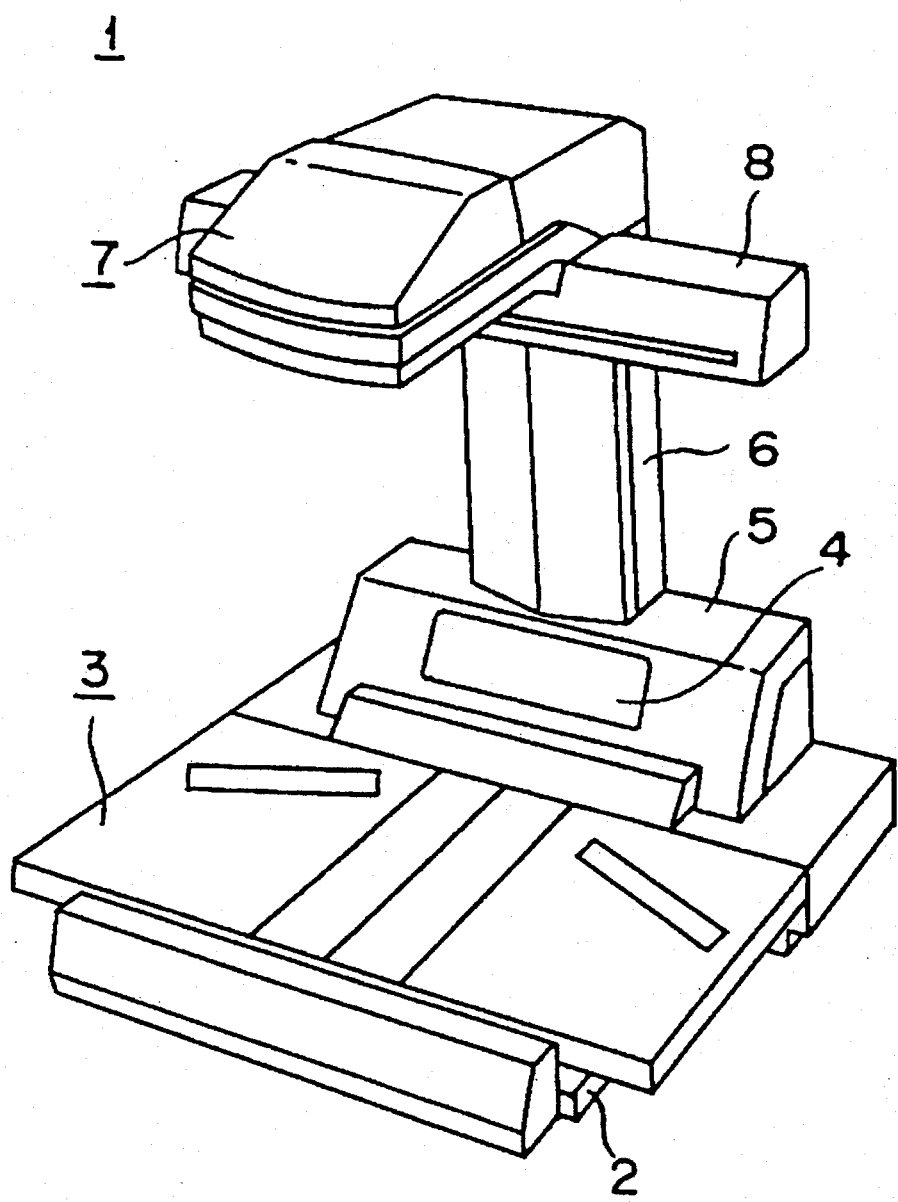
FIG. 1 is a perspective view showing a camera type scanner using the document placement mechanism of the present invention.

FIG. 1 is a perspective view showing a camera-type scanner (image reader) device using the document placement mechanism of the present invention.

As shown in the drawing, scanner 1 is provided with a table 2 which forms the base of scanner 1. On table 2 is provided an embodiment of document placement platform 3 for supporting a document (not illustrated) bearing the image to be read with the pages S of said document to be read (hereinafter referred to as 'reading surface') disposed face upward on the platform. Terminal 5 provided with a display panel 4 for displaying operation messages and operation conditions is provided inwardly facing on the interior side of table 2. Support column 6 stands on terminal 5. Head unit 7, mounted on column 6 so as to be vertically movable in one direction and an opposite direction, is provided with lamp 8 for optical exposure, and charge-coupled device (CCD) sensor or the like for reading documents via lens and the like (not illustrated). A one-dimensional sensor or two-dimensional sensor may be used as the CCD sensor, and monochrome (black and white) or color type sensors may be used. Image data read by the aforesaid CCD sensor can be printed out via a printer, digital copier (neither are illustrated) or like output means, or stored in a storage device such as an optomagnetic disk (not illustrated) after being output to a microcomputer screen for editing and correction.

Figure 2A:
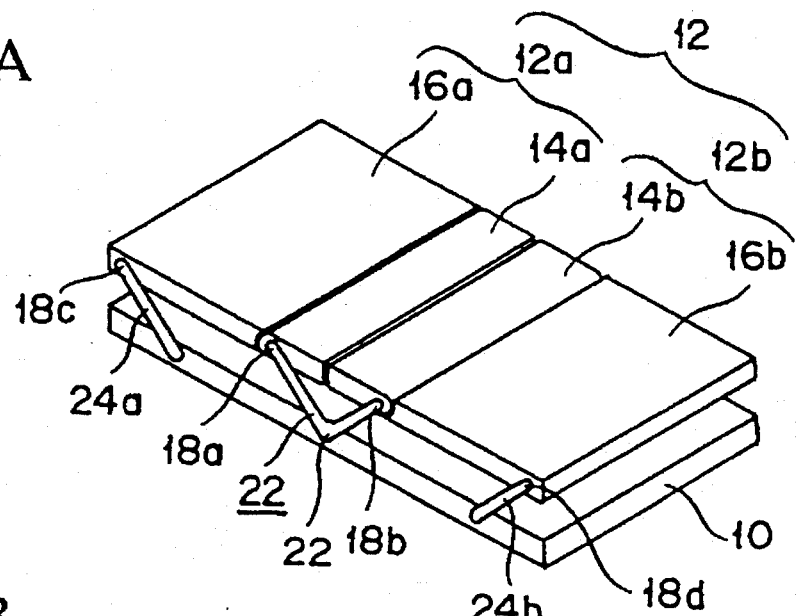
FIG. 2A is a perspective view showing the construction of the document placement mechanism.
Figure 2B:
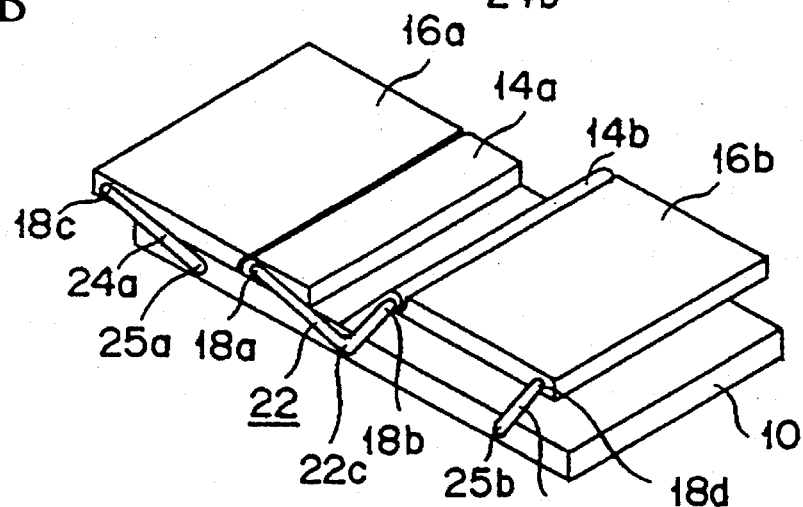
FIG. 2B is a perspective view showing the construction of the document placement mechanism with a left side lowered.
Figure 2C:
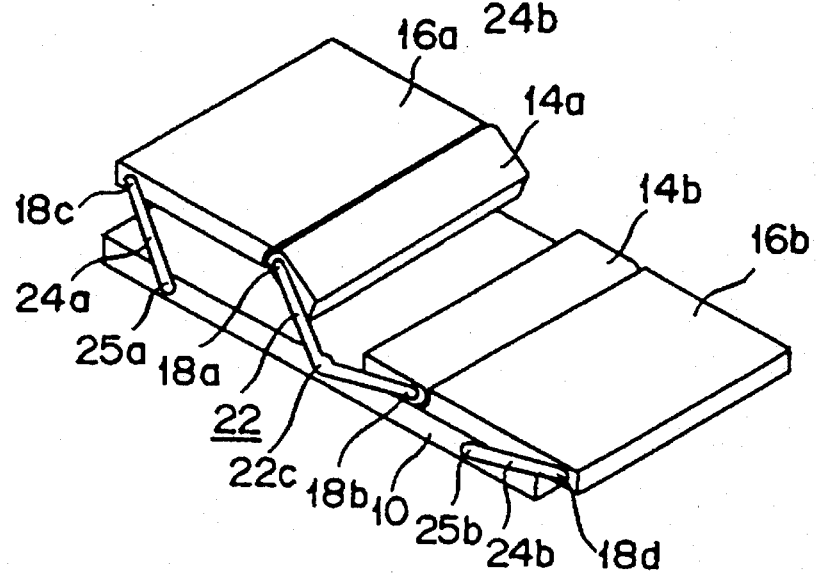
FIG. 2C is a perspective view showing the construction of the document placement mechanism with a left side lowered.
Figure 3A:
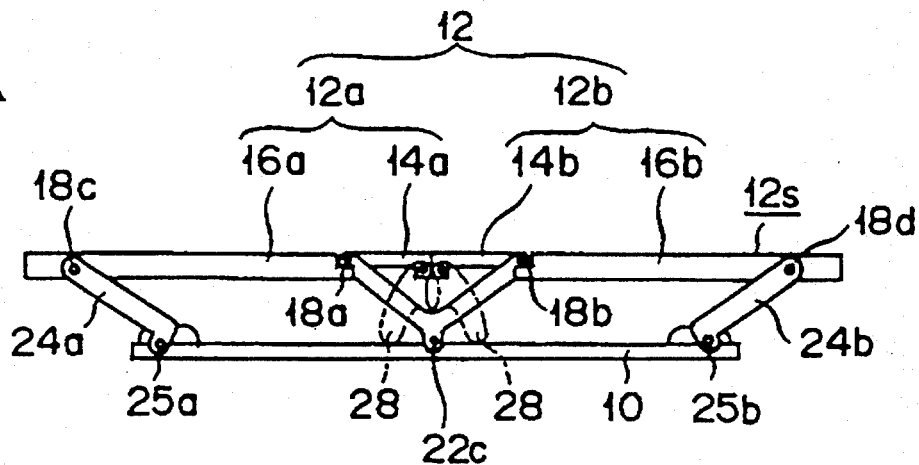
FIG. 3A is a side view showing the construction of the document placement mechanism.

FIGS. 2A–2C are perspective views showing an embodiment of the document table of the present invention. FIG. 3 is a side view, and FIG. 4 is an enlarged side view of the center linkage member.

As shown in FIGS. 2 and 3, document table 3 basically comprises base plate 10 connected to table 2 of scanner 1, and platform 12 (12a, 12b) linked to base plate 10 via a linkage member so as to be oscillatable.

Platform 12 comprises right and left platforms 12a and 12b comprising four aligned platforms including a set of interior platforms 14a and 14b provided adjacent to the center portion, and exterior platforms 16a and 16b respectively positioned on the outer side of said interior platforms 14a and 14b. The interior platforms are linked to the exterior platforms 16a and 16b to allow rotation via rotation shafts 18a and 18b. Interior platforms 14a and 14b correspond to the back cover portion of book document B when the document disposed on document platform face 12s (refer to FIG. 3A) is a book-like document (refer to FIG. 3C).

Figure 4A:
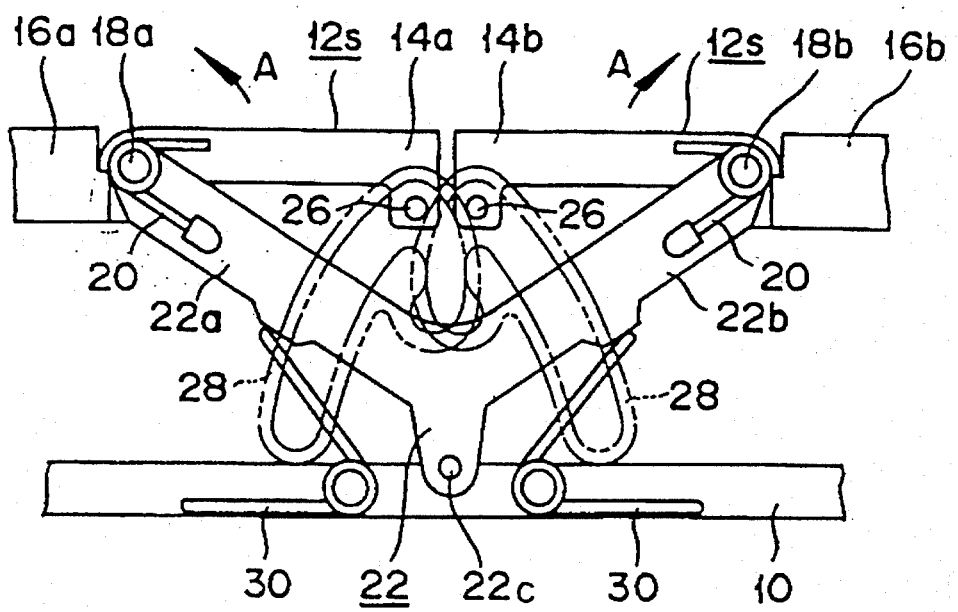
FIG. 4A partial enlargement showing the condition of the center linkage member of the document placement mechanism.

As shown in FIG. 4, bilateral interior platforms 14a and 14b are pressed against exterior platforms 16a and 16b by means of torsion springs 20 attached to a portion of each rotation shaft 18a and 18b such that said bilateral interior platforms 14a and 14b are rotatable in the arrow A direction about said rotation shafts 18a and 18b. The aforesaid rotation is stopped at the position indicated by the solid line in FIG. 4A by means of a stop member not shown in the illustration. Accordingly, when document table 3 is at the standard position shown in FIG. 4A without a book disposed thereon, right and left platforms 12a and 12b are positioned in the same plane.

As shown in the drawings, the curved portion of V-shaped center linkage member 22 is rotatably supported at the center portion on both sides of base plate 10 (only the front side is shown in the illustrations), and rotation shafts 18a and 18b are connected to the leading edges of arms 22a and 22b of said center linkage member 22 so as to be rotatable. As shown in FIGS. 2 and 3, exterior linkage members 24a and 24b, which are connected to the exterior edge portion of exterior platforms 16a and 16b so as to be rotatable, are rotatably supported by the bilateral exterior portions of base plate 10 (only the front side is shown in the illustrations).

Figure 3B:
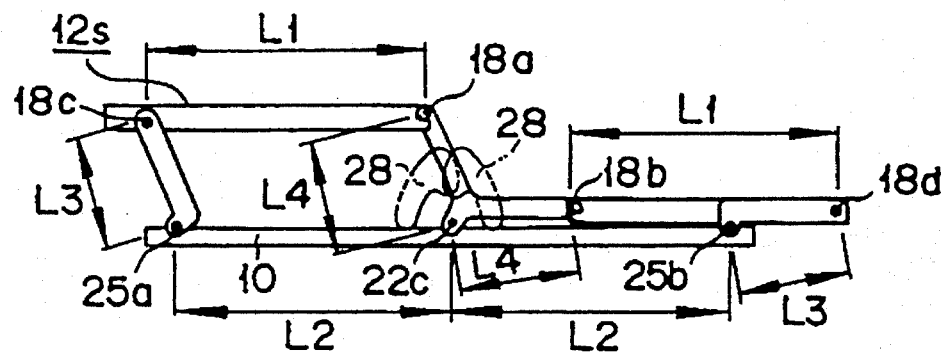
FIG. 3B is a side view showing the construction of the document placement mechanism.

As shown in FIG. 3B, the various components of document table 3 are arranged such that rotation shafts 22c and 25a (22c and 25b) linking base plate 10 and linkage members 22 and 24 (22a and 24b), and rotating shafts 18a and 18c (18b and 18d) linking exterior platforms 16a and 16b and linkage members 22 and 24, are connected so as to form parallel quadrilateral constructions. The distance L1 between the two rotation shafts 18a and 18c (18b and 18d) is equal to the distance L2 between the rotation shafts 22c and 25a (22c and 25b) of base plate 10. The distance L3 between the two rotation shafts 18a and 25a (18d and 25b) is equal to the distance L4 between the two rotation shafts 22c and 25a (22c and 25b). Therefore, document platform face 12s is normally parallel to base plate 10 while holding the face 12s in horizontal orientation even when moved via the rotation of linkage member 22 and 24.

Figure 4B:
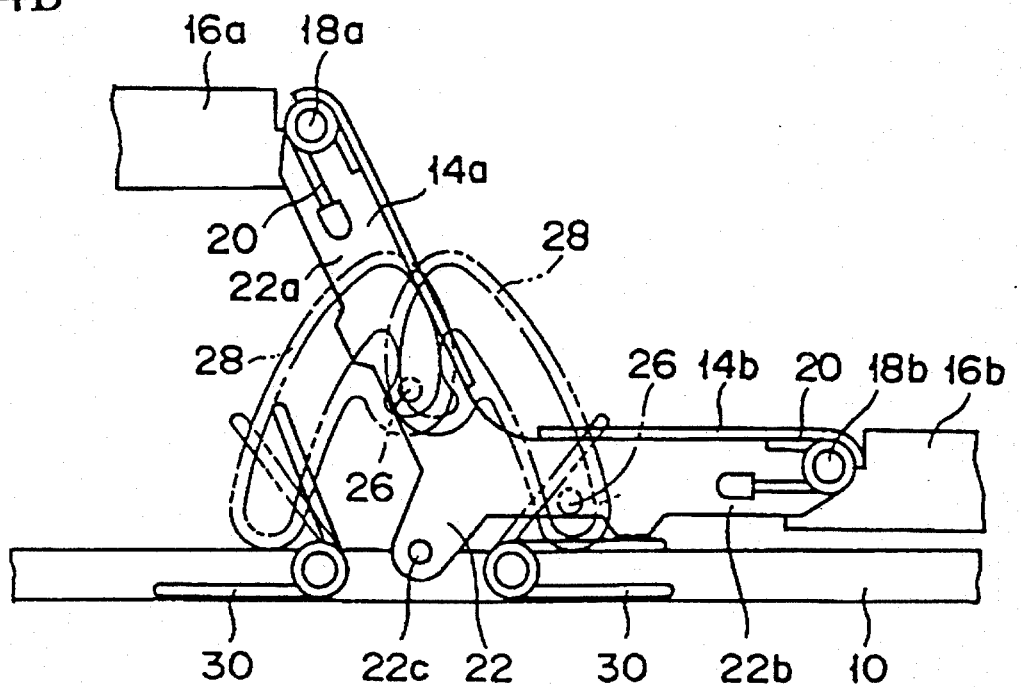
FIG. 4B partial enlargement showing the condition of the center linkage member of the document placement mechanism.

As shown in FIGS. 4A and 4B, the center portion of base plate 10 is provided with a grooved cam 28 engaging roller 26 mounted on the center of bilateral interior platforms 14a and 14b. Grooved cam 28 is actually mounted on document table 3, but is simply indicated by the dashed line in the drawings with the supporting construction omitted to facilitate understanding and clarity of the illustrations.

Grooved cam 28 positions bilateral interior platforms 14a and 14b parallel to exterior platforms 16a and 16b when platform 12 is in the standard position (refer to FIG. 4A). When linkage members 22 and 24 are rotated and move right and left platforms 12a and 12b, roller 26 move along the channel of grooved cam 28, as shown in FIG. 4B, such that one interior platform 14a is inclined. Thus, when linkage members 22 and 24 are rotated and move exterior platforms 16a and 16b to predetermined positions, interior platform 14a connected to exterior platform 16a is accurately inclined at the relative top side regardless of the weight of book document B. Means other than a grooved cam may be used as the means for inclining interior platforms 14a and 14b, such as, for example, other types of cams, or linkage mechanisms, or rack and pinion mechanisms.

As shown in FIGS. 4A and 4B, center linkage member 22 is acted upon by the elastic force of torsion spring 30 mounted on base plate 10, such that when book document B is removed and the load applied to platform 12 is eliminated, platform 12 returns to the standard position indicated in FIG. 4A from the position indicated in FIG. 4B. Platform 12 is positioned at the standard position even when equal weights are applied to the right and left sides of platforms 12a and 12b.

Figure 3C:
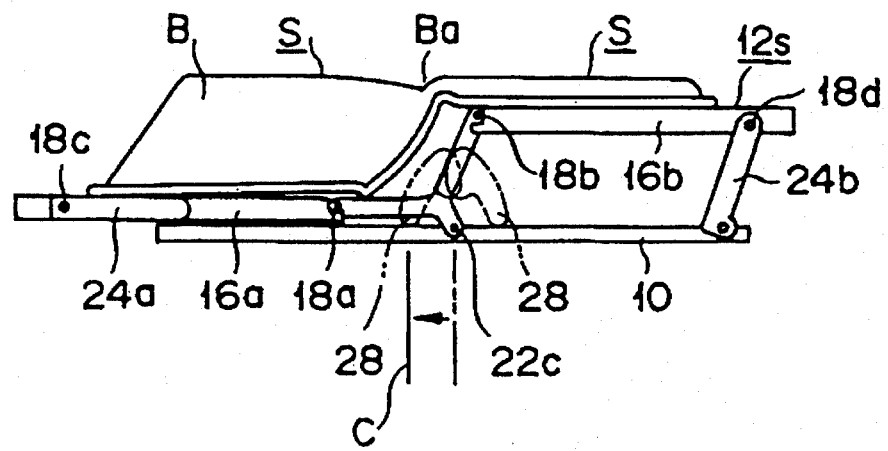
FIG. 3C is a side view showing the construction of the document placement mechanism.

On the other hand, as shown in FIG. 3C, when a book-like document B is disposed on platform 12 and the proportion of pages on the right and left sides of said book document B are not equal, the load applied to right and left platforms 12a and 12b is uneven, such that center linkage member 22 rotates around rotation shaft 22c, and one exterior platform 16b moves upward while the other exterior platform 16a moves downward. At this time, exterior platform 16a is supporting the greater weight and is moved downward, such that the height of the right and left sides of the open reading surface S of book B is automatically equalized. Accordingly, the reading surface S remains horizontal without being pressed against a transparent glass platen, thereby improving document reading accuracy. Furthermore, damage to book B induced by pressing against the glass platen is thereby prevented. Interior platform 14b is inclined as a result of the movement along grooved cam 28 of roller 26 of interior platform 14b connected to exterior platform 16b at a relatively higher position, as shown in FIG. 3C.

In the case of book document B, when the pages are sequentially turned as the reading operation progresses, the gutter Ba (refer to FIG. 3C) of open book document B gradually moves. That is, the center position Ba of the open reading surface S moves in the document width direction (left-to-right direction). The thicker the book, the greater the amount of the aforesaid movement. Accordingly, the position of book B must be moved in the opposite direction to the aforesaid amount of movement to normally arrange the open reading surface S at a predetermined position relative to the reading means such as a CCD sensor or the like.

Regarding changes in the weight of the right and left sides of book document B caused by turning the pages, in document table 3 of the present embodiment, this change in weight is used to move platform 12 accommodating book B in the width direction. That is, when the weight supported by right and left platforms 12a and 12b are different, right and left exterior platforms 16a and 16b move (vertically) relatively in one direction and an opposite direction such that a difference in height is produced, and the amount of movement of platform 12a in the width direction is determined based on said difference in height.

For example, in the case of the previously described document table 3, platform 12 is moved in the width direction by converting the vertical displacement of exterior platforms 16a and 16b to displacement in the width direction via center linkage member 22, so as to move the center position Ba of open reading surface S. As shown in FIG. 3C, in the aforesaid construction, center position C of platform 12 moves to the side of the downwardly moving exterior platform 16a. Thus, open reading surface S normally can be set at a predetermined position within the angle of field of the CCD sensor by suppressing the movement of the center position Ba of open reading surface S in the width direction.

Figure 5:
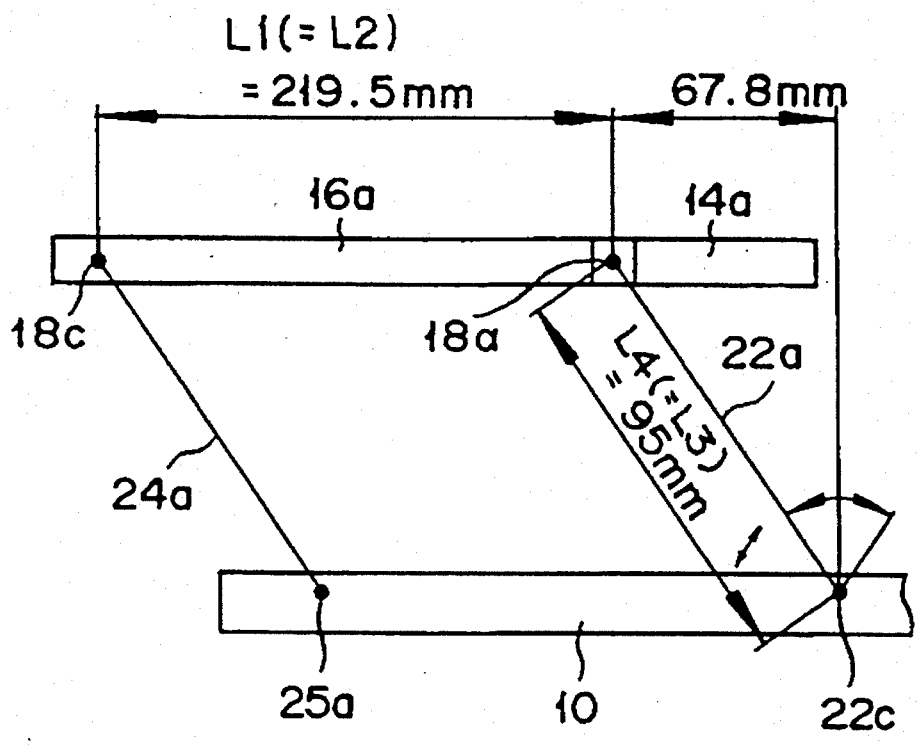
FIG. 5 is a partial side view showing the dimensions of the document placement mechanism.
Figure 6A:
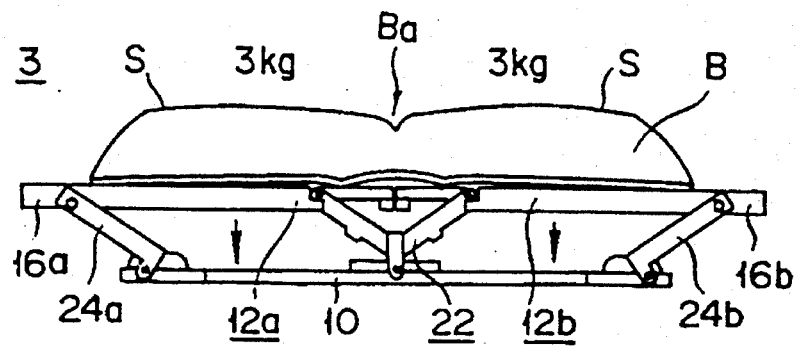
FIG. 6A is a side view showing the operational conditions of the document placement mechanism supporting a book-like document.
Figure 6B:
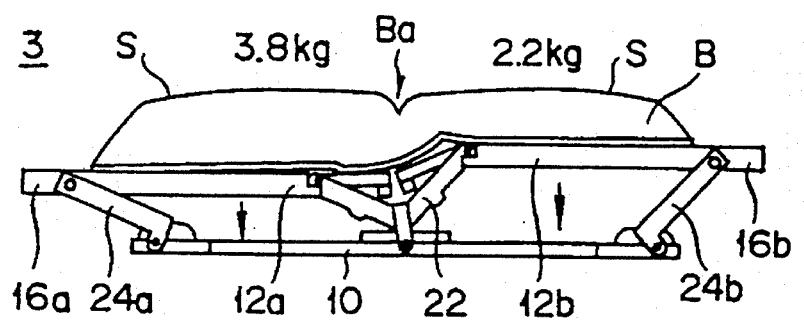
FIG. 6B is a side view showing the operational conditions of the document placement mechanism supporting a book-like document.
Figure 6C:
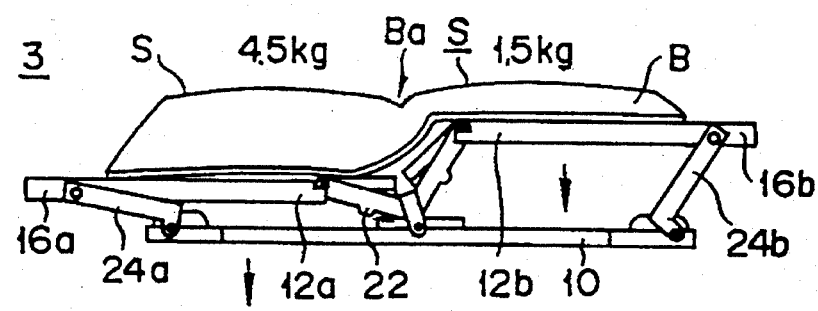
FIG. 6C is a side view showing the operational conditions of the document placement mechanism supporting a book-like document.
Figure 6D:
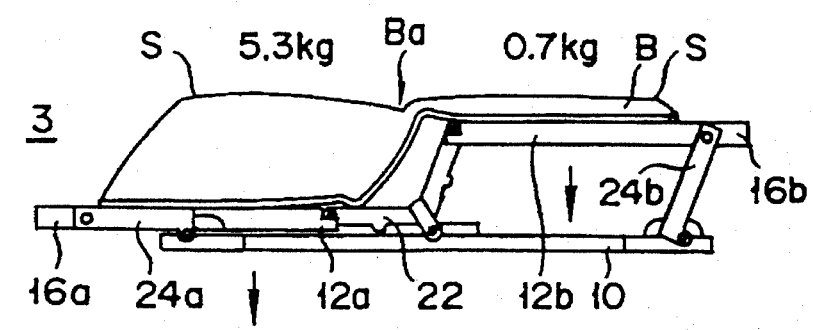
FIG. 6D is a side view showing the operational conditions of the document placement mechanism supporting a book-like document.

A specific example is described hereinafter in terms of a document table capable of accommodating a large book-like document of A4 size, 100 mm thick, and weighing 6 kg. Refer to FIGS. 5 and 6.

As shown in FIG. 5, the distance L4 (=L3) between rotation shafts 18a and 22c of center linkage member 22 connecting base plate 10 and platforms 12a and 12b is set at 95 mm, such that rotation shafts 18a and 18b are separated at 135.6 mm in the width direction. In this instance, both arms of V-type center linkage member 22 are set at an 88.9° angle. At this setting, when the height of one exterior platform is lowered 1 mm, the height of the other exterior platform is raised 0.5~0.8 mm. The distance L1 (=L2) between both rotation shafts 18a and 18c (18b and 18d) of exterior platforms 16a and 16b, which are connected to center linkage member 22 and exterior linkage member 24 so as to rotate freely, is set at 219.5 mm.

The total weight of left (right) platform 12a (12b) comprising exterior platform 16a (16b) and interior platform 14a (14b) is 1.5 kg, and the length in the interior direction is set at a dimension capable of accommodating an A4 size document. Accordingly, when a book weighing 6 kg is disposed on the platform, a total load of 7.5 kg is applied to one platform about 100 gf/mm abuts both arms 22a and 22b of center linkage members 22 (only one is illustrated) provided bilaterally on base plate 10. When set to the aforesaid value in the case of typical book-like documents, platform 12 is moved in accordance with the amount of movement of center position Ba of open reading surface S. Right and left platforms 12a and 12b can be stopped at a predetermined equilibrium position even when the total weight of book B is applied to one exterior platform 16a (16b). The center of twist of torsion spring 30 is set at a position different from the rotational center 22c of center linkage member 22. Document table 3 may also accommodate sheet-like document in the present embodiment in accordance with the requirements of scanner 1.

FIG. 6 is a side view showing document table 3 when a book-like document B of A4 size, 100 mm thick, and weighing 6 kg is disposed thereon. In the drawings FIG. 4A shows the state wherein the Weight of book B is equally distributed on right and left platforms 12a and 12b; FIGS. 4B~D show the states of document table 3 when the weight of book B is Variously distributed on right and left platforms 12a and 12b. From these drawings it can be understood that when document weight is equally distributed, right and left platforms 12a and 12b are maintained in position in the same plane, but when the distribution of weight is unequal, one exterior platform 16a (left side in the drawings) is lowered.

For example, when the weight distribution of book B is 3.8 kg to 2.2 kg (refer to FIG. 6B), the amount of movement of the center position is 1.7 mm. When the weight distribution is 4.5 kg to 1.5 kg (refer to FIG. 6C), the amount of movement of the center position is 5.4 mm. When nearly all weight of book B is applied to only one platform in a weight distribution of 5.3 kg to 0.7 kg (refer to FIG. 6D), the amount of movement of the center position is 12.6 mm.

Conventionally, when a platform accommodating a book does not move vertically (not illustrated), the center position Ba of open reading surface S is moved proportionally to the difference in right and left page distribution, i.e., the difference in weight distribution. That is, for example, if the weight distribution is 3.8 kg to 2.2 kg, the right/left weight difference of 1.6 kg is about one half the equal division of the total weight of 6 kg, and document thickness is about 100 mm, such that the center position moves about 13.3 mm. Furthermore, when the weight distribution is 4.5 kg to 1.5 kg, center position movement is about 25 mm, and when weight distribution is 5.3 kg to 0.7 kg, center position movement is about 38.3 mm.

As can be understood from comparison of the aforesaid values, when document table 3 of the present invention is used, the amount of movement in the width direction of center position Ba of open reading surface S of book B can be suppressed to about 30% of conventional movement, as a result, center position Ba of open reading surface S is maintained within a range which does not present a problem from a practical standpoint. That is, reading surface S of book B is normally maintained within a range readable by the CCD sensor. Accordingly, the operation can be completed without correcting the placement of book B even when reading from the first page to the last page of said book B.

When one exterior platform 16a (16b) is lowered, the lifting amount of the other exterior platform 16b (16a) and the movement amount of center position C of platform 12 in the width direction may be varied by suitably changing the angle and length of the arm of center linkage member 22, and the linkage position with right and left platforms 12a and 12b (i.e., the positions of rotation shafts 18a, 18b, and 22c). Accordingly, the configuration of center linkage member 22 and exterior linkage member 24 may be changed so as to match the size, type and specification of the document to be read and spacing of document table 3 relative to the document reading device of scanner 1 or the like, thereby allowing optional setting of the amount of movement in the width direction and vertical separation of platform 12.

In document table 3 of the previously described embodiment, the platform for moving the document in the width direction is moved using V-type linkage member 22, but the means for moving the document in the width direction is not limited to this arrangement inasmuch as, for example, the vertical movement of right and left platforms 12a and 12b may be detected by detection means such as a displacement sensor or the like, and movement in the width direction can be accomplished by a drive means such as a motor or the like in an amount corresponding to said amount of vertical movement.

Compression springs, or an elastic member comprising an elastic material such as sponge, rubber or the like may be used instead of the aforesaid torsion springs 20 and 30 to apply force on the various platforms and linkage members in a predetermined direction. The performance of the elastic member (for example, the spring constant in the case of a spring) is one element determining the movement distance of exterior platforms 16a and 16b in the vertical and width directions, and it is desirable that it be selected based on the paper quality of the document (e.g., ream weight and the like). In the case of book-like documents, an elastic member having intermediate elasticity should be selected for the majority of books, and when the height of right and left reading surfaces S of book B are not in alignment, an operator may align the heights of reading surface S. That is, a predetermined width may be set for the stopping position of platform 12 regardless of the effects of friction and the like on the engaged portions of the various members, and if the predetermined stopping position aligned with right and left heights is within the previously described range, an operator can manually move platform 12 sufficiently to said predetermined position thereby easily aligning the heights of right and left reading surfaces S even when said right and left heights of reading surface S are not aligned at the initial stopping position of platform 12.

In the aforesaid embodiment, interior platforms 14a and 14b are inclined using a cam mechanism comprising roller 26 and grooved cam 28. Although torsion spring 30 is used in the present embodiment, either a spring 30 or cam mechanism alone may be used insofar as each interior platform 14a and 14b can be positioned at predetermined positions. When only spring 30 is used, interior platforms 14a and 14b can be inclined in accordance with the inclination of the spine of the book. When grooved cam 28 is provided, interior platforms 14a and 14b are positioned by said grooved cam 28, such that individual stopping member (not illustrated) need not be provided.

Another embodiment is described hereinafter with reference to the accompanying drawings. In this embodiment, parts common to the previous embodiment are designated by like reference numbers, and identical elements of construction are omitted from the discussion.

As shown in FIG. 7, platform 12 of document table 3a of the present embodiment comprises three component members: two exterior platforms 16a and 16b, and rod member 16c arranged between platforms 16a and 16b and having triangular cross section accommodated in a triangular recessed portion formed by the contact areas of both platforms 16a and 16b. Exterior platforms 16a and 16b are supported by rotatable linkage members 22e, 22f, 24a, 24b (only the front side is illustrated) which only support exterior platforms 16a and 16b. When a load is not applied, said platforms 16a and 16b are forced to a standard position indicated in FIG. 7A by a tension spring (not illustrated).

Figure 7A:
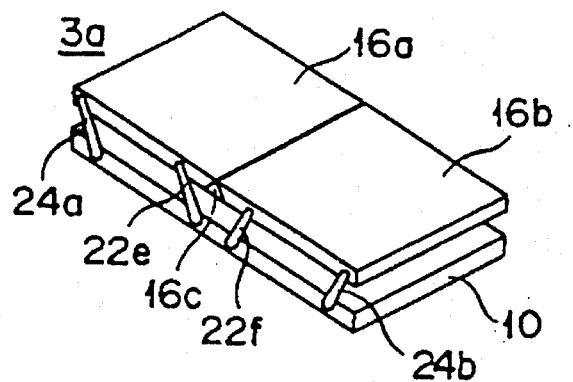
FIG. 7A is a perspective view showing a second embodiment of the document placement mechanism.
Figure 7B:
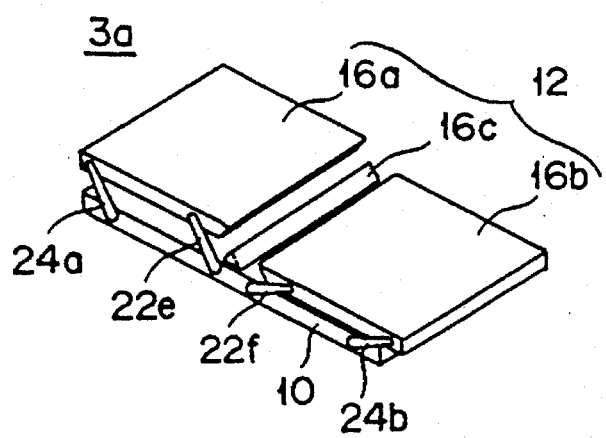
FIG. 7B is a perspective view showing a second embodiment of the document placement mechanism.
Figure 7C:
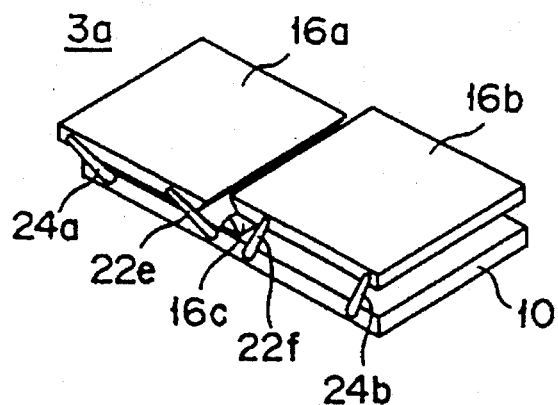
FIG. 7C is a perspective view showing a second embodiment of the document placement mechanism.
Figure 7D:
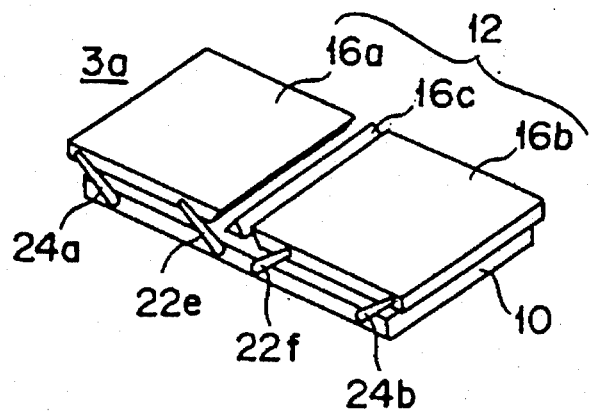
FIG. 7D is a perspective view showing a second embodiment of the document placement mechanism.

Right and left exterior platforms 16a and 16b of document table 3 a of the present embodiment may be individually moved vertically in one direction and an opposite direction, and based on the ability to position right and left reading surfaces of a book (not illustrated) in a single plane, the height of said right and left reading surfaces from the base plate can be changed in the state wherein said platforms are positioned in a single plane. Accordingly, right and left reading surfaces positioned in a single plane can be moved to a lens point position, such that it is possible to read right and left documents once in a state wherein the lens point is stationary. Since right and left exterior platforms 16a and 16b can be individually raise and lowered, the amount of movement of the center position of platform 12 in the width direction can be changed when one exterior platform 16a (16b) is moved by moving the other exterior platform 16a (16b) to the same position. FIGS. 7B–D are perspective views showing the vertical movement and width direction movement of exterior platforms 16a and 16b when a book-like document disposed on platform 12. The members exerting force on exterior platforms 16a and 16b are not limited to tension springs, insofar as elastic members such as compression springs, torsion springs and the like may be used.

On the other hand, rod member 16c is retractably movable in a perpendicular direction relative to base plate 10, and the vertical movement is in accordance with the thickness, weight, and shape of the book. Accordingly, when platform 12 is in a state of not accommodating a document and a document is placed on platform 12 in the position indicated in FIG. 7A, it is pressed downward at a position corresponding to the position of the document (refer to FIGS. 7A–D). The cross section configuration of rod member 16c may be, for example, trapezoidal or the like. A material having elasticity such a sponge, rubber or the like may be used for rod member 16c. When such materials are used, a document can be supported in a more stable state because rod member 16c is deformed in correspondence with the shape of the document, particularly the spine portion of a book.

Linkage members 22e and 22f of the present embodiment may be integratedly formed as the previously described V-type linkage member 22. In such circumstances, the movement of both platforms 16a and 16b can be linked, such that movement of the center position of the reading surface of the open book can be effectively corrected.

Document tables 3 and 3a of the previously described embodiments may be used as a document table for various devices in addition to camera-type image reader device, e.g., as the document table of a projector or the like.

The document table of the present invention is not limited to the aforesaid embodiments and may be variously modified insofar as such modifications do not depart from the scope of the invention.

For example, although the height of right and left reading surfaces of a document can be automatically equalized via the operation of aforesaid document tables 3 and 3a, said adjustments may not be adequate at all times due to the multiplicity of specifications of books of which thickness is foremost. In such circumstances, the height of right and left reading surfaces may be automatically aligned by automatic operation of platforms 16a and 16b, or rod member 16c.

Figure 8:
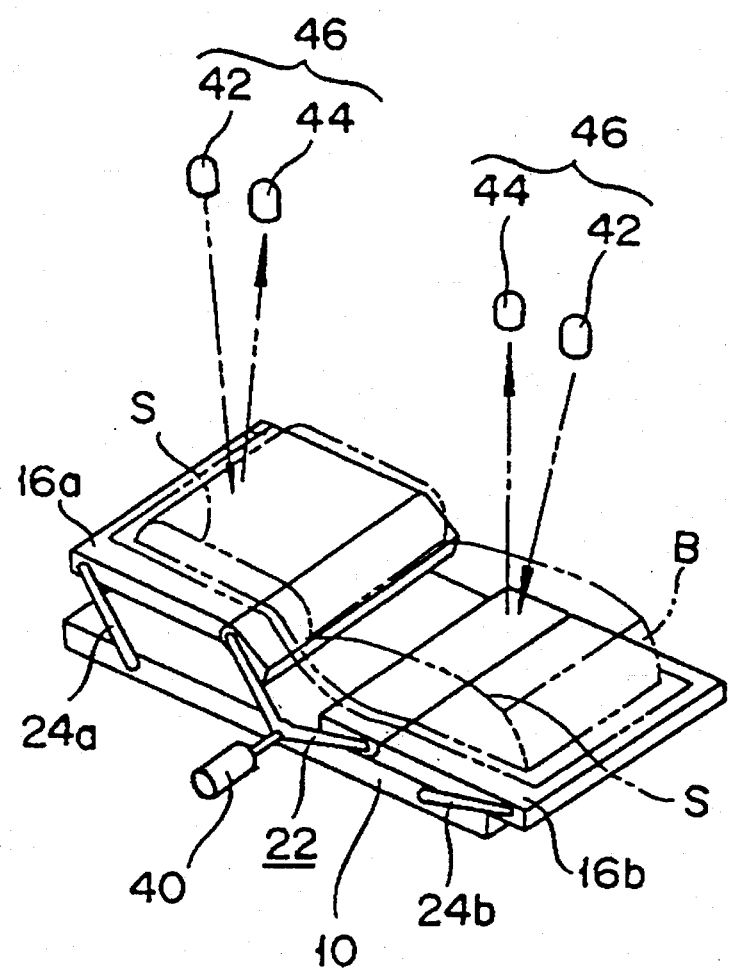
FIG. 8 is a perspective view showing a third embodiment of the document placement mechanism.

In the case of document table 3 describe in the first embodiment, a motor 40 may be connected to a portion of rotation shaft 22c to rotate center linkage member 22, as shown in FIG. 8. In the case of document table 3a, exterior platforms 16a and 16b may be actuated by separate motors. An infrared sensor 46 comprising infrared emitter portion 42 and photoreceptor portion 44 may be provided at positions corresponding to both exterior platforms 16a and 16b, such that a signal corresponding to the height of the reading surface of book B on exterior platforms 16a and 16b detected by said infrared sensor 46 is fed back to a control means (not illustrated) for operating motor 40. When the removal of book B from platform 12 is detected, motor 40 is operated by the control means to return platform 12 to a predetermined standard position. Thus, motor 40 can be operated in accordance with the height of right and left reading surfaces S of book B, such that right and left reading surfaces S of book B can be aligned. Furthermore, after book B is removed, the position of platform 12 may be returned to a predetermined standard position after the elapse of a predetermined time, or platform 12 may be returned to a predetermined position at the moment reading of book B is completed. Platform 12 may alternatively be returned to a predetermined standard position in accordance with instructions from an operator via button operation or the like without automating the period for returning platform 12 to a predetermined position.

The means for detecting height is not limited to the aforesaid infrared sensor, inasmuch as an ultrasonic sensor or the like may be used. Since a book is typically made of homogenous quality paper excluding the cover portion, a pressure detection mean (not illustrated) such as a pressure sensor may be provided on the surface of right and left exterior platforms 16a and 16b, such that the presence and absence of a book can be detected based on the pressure value detected by said pressure sensor, and a drive means such as motor 40 or the like could be operationally controlled in accordance with said detection. Drive means for operating linkage members 22, 24a and 24b are not limited to the aforesaid arrangement, inasmuch as various other means may be used. Accordingly, a combination of various types of detection means may be used to detect height.

According to the present invention, the open pages of a book set facing upward can be positioned in the same plane so as to be horizontal without being pressed against a transparent plate from above.

Furthermore, the center position of a document can be maintained within a predetermined range by moving platforms 16a and 16b accommodating said document in a horizontal direction.

Therefore, when an image reader device is provided with the previously described document table, open right and left pages are positioned in the same plane, such that a data processing operation such as correction of data reading errors are extremely easy. Furthermore, damage to documents occurring when the document is pressed against a plate are avoided because no such operation is required.

Since the center position of the document is maintained within a predetermined range by moving platforms 16a and 16b in a horizontal direction, the portion read for image information can be positioned at a predetermined position. Therefore, it is unnecessary to correct the positioning of the document during the reading operation.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A document placement mechanism comprising:

a first platform for placement of pages on the left side of an open book document on the top surface thereof;

a second platform provided adjacent to said first platform for placement of pages on the right side of an open book document on the top surface thereof;

a support mechanism for supporting said first and second platforms so as to be movable in vertical and bilateral directions while holding the top surfaces of said first and second platforms in a horizontal orientation, said support mechanism including a linkage means for linking the movement of said first and second platforms and for sliding said first platform in a rightward direction when raised, thereby inducing said second platform to slide in a rightward direction while being moved in a downward direction, and for sliding said first platform in a leftward direction when lowered, thereby inducing said second platform to slide in a leftward direction when being moved in an upward direction, so that a center portion of the open book document is located at a fixed position, the linkage means including a plurality of linkage members that are positioned at respective acute angles when the platforms are aligned in the same plane.

2. A document placement mechanism as claimed in claim 1, wherein said linkage means includes a V-type linkage arm member which is rotatably supported at the center portion thereof and is rotatably connected to said first and second platforms at the both of end portions thereof so as to link the first and second platforms to each other.

3. A document placement mechanism as claimed in claim 1, further comprising third and forth platform which are provided between said first and second platform for placement of a back cover portion of an open book document on the top surface thereof.

4. A document placement mechanism as claimed in claim 3, wherein said third platform is rotatably connected to the first platform, and said forth platform is rotatably connected to the second platform.

5. A document placement mechanism comprising:

a first platform for placement of pages on one side of an open book document on the top surface thereof;

a second platform provided adjacent to said first platform for placement of pages on the other side of an open book document on the top surface thereof;

a support mechanism for supporting said first and second platforms so as to be movable in vertical and horizontal directions while holding the top surfaces of said first and second platforms in a horizontal orientation, said support mechanism including linking means, including a V-shaped type linkage arm member which is rotatably supported at the center portion thereof and is rotatably connected to said first and second platforms at both end portions thereof so as to link the first and second platforms to each other, for sliding said first platform to the interior side when raised, thereby inducing said second platform to slide to the exterior side while being moved in a downward direction, and for sliding said first platform to the exterior side when lowered, thereby inducing said second platform to slide to the interior side while being moved in an upward direction, so that a center portion of the open book document is located at a fixed position.

6. A document placement mechanism as claimed in claim 5, further comprising third and fourth platform which are provided between said first and second platform for placement of a back cover portion of an open book document on the top surface thereof.

7. A document placement mechanism comprising:

four aligned platforms including a set of interior platforms provided adjacent to the center portion and two exterior platforms respectively positioned on the outer side of said interior platforms, wherein said exterior platforms respectively support right side pages and left side pages of a open book document disposed face upward thereon and said interior platforms support a back cover portion on an open book document disposed face upward thereon;

a support mechanism for supporting said exterior platforms so as to be movable in vertical and horizontal directions while holding the top surfaces of the exterior platforms in a horizontal orientation, said support mechanism including a V-shaped linkage member of which the curved portion is rotatably supported, said V-shaped linkage member having arms of which the leading edges are respectively connected to said exterior platforms so as to link the exterior platform to each other, whereby said one of said exterior platforms slides to the interior side when raised inducing another of said exterior platforms to slide to the exterior side while being moved in a downward direction, and said one of said exterior platforms slides to the exterior side when lowered inducing said another of the exterior platforms to slide to the interior side while being moved in an upward direction.

8. A document placement mechanism as claimed in claim 7, wherein said four aligned platforms are positioned in the same plane when a book document is not disposed thereon.

9. A document placement mechanism as claimed in claim 7, wherein said interior platforms are linked to said exterior platforms to allow rotation thereof.

10. A document reader comprising:

a first platform for placement of pages on the left side of an open book document on the top surface thereof;

a second platform provided adjacent to said first platform for placement of pages on the right side of an open book document on the top surface thereof;

a support mechanism for supporting said first and second platforms so as to be movable in vertical and bilateral directions while holding the top surfaces of said first and second platforms in a horizontal orientation, said support mechanism including linkage means for linking the movement of said first and second platforms and for sliding said first platform in a rightward direction when raised thereby inducing said second platform to slide in a rightward direction while being moved in a downward direction, and for sliding said first platform in a leftward direction when lowered, thereby inducing said second platform to slide in a leftward direction while being moved in an upward direction, so that a center portion of the open book document is located at a fixed position, the linkage means including a plurality of linkage members that are positioned at respective acute angles when the platforms are aligned in the same plane; and an image reader which is positioned above said first and second platforms for reading the open book document disposed face upward on said first and second platforms.

11. A document placement mechanism comprising:

a first platform for placement on the top surface thereof, of pages on the left side of an open book document;

a second platform provided adjacent to said first platform for placement, on the top surface thereof, of pages on the right side of an open book document;

a first support mechanism which supports said first and second platforms so as to be movable in vertical directions while holding the top surface of said first and second platforms in a horizontal orientation; and a second support mechanism which supports said first and second platforms so as to be movable in bilateral directions, the amount of movement of the first and second platforms in the bilateral directions by said second support mechanism being determined based only on a difference in height produced upon vertical movement of the first and second platforms by said first support mechanism.

12. A document placement mechanism as claimed in claim 11, wherein said second support mechanism includes a V-shaped linkage arm member which is rotatably supported at a center portion thereof and is rotatably connected to said first and second platforms at both end portions thereof so as to link the first and second platforms to each other.

13. A document placement mechanism as claimed in claim 11, further comprising:

third and fourth platforms which are provided between said first and second platforms for placement of a back cover portion of an open book document on top surfaces thereof.

14. A document placement mechanism as claimed in claim 13, wherein said third platform is rotatably connected to the first platform, and said fourth platform is rotatably connected to the second platform.

* * * * *